United States Patent
Purkayastha et al.

(10) Patent No.: US 9,734,062 B2
(45) Date of Patent: Aug. 15, 2017

(54) SYSTEM AND METHODS FOR CACHING A SMALL SIZE I/O TO IMPROVE CACHING DEVICE ENDURANCE

(71) Applicant: Avago Technologies General IP (Singapore) Pte. Ltd., Singapore (SG)

(72) Inventors: Saugata Das Purkayastha, Bangalore (IN); Luca Bert, Cumming, GA (US); Horia Simionescu, Foster City, CA (US); Kishore Kaniyar Sampathkumar, Bangalore (IN); Mark Ish, Atlanta, GA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 343 days.

(21) Appl. No.: 14/132,440

(22) Filed: Dec. 18, 2013

(65) Prior Publication Data
US 2015/0169458 A1    Jun. 18, 2015

Related U.S. Application Data

(60) Provisional application No. 61/915,718, filed on Dec. 13, 2013.

(51) Int. Cl.
| | |
|---|---|
| *G06F 12/0811* | (2016.01) |
| *G06F 12/0886* | (2016.01) |
| *G06F 12/0846* | (2016.01) |
| *G06F 12/122* | (2016.01) |

(Continued)

(52) U.S. Cl.
CPC ...... *G06F 12/0811* (2013.01); *G06F 12/0846* (2013.01); *G06F 12/0866* (2013.01); *G06F 12/0886* (2013.01); *G06F 12/0891* (2013.01); *G06F 12/122* (2013.01)

(58) Field of Classification Search
CPC .......... G06F 17/30902; G06F 12/0815; G06F 12/0897; G06F 2212/222; G06F 12/0866; G06F 12/0871; G06F 12/0891; G06F 2212/466
See application file for complete search history.

(56) References Cited

U.S. PATENT DOCUMENTS

| | | | | |
|---|---|---|---|---|
| 5,325,503 A | * | 6/1994 | Stevens | G06F 12/0811 711/146 |
| 5,761,705 A | * | 6/1998 | DeKoning | G06F 11/1666 711/113 |
| 8,321,630 B1 | | 11/2012 | Vaid | 711/114 |

(Continued)

*Primary Examiner* — Reginald Bragdon
*Assistant Examiner* — Thanh Vo
(74) *Attorney, Agent, or Firm* — Sheridan Ross P.C.

(57) ABSTRACT

An apparatus comprising a memory and a controller. The memory may be configured to (i) implement a cache and (ii) store meta-data. The cache comprises one or more cache windows. Each of the one or more cache windows comprises a plurality of cache-lines configured to store information. Each of the cache-lines comprises a plurality of sub-cache lines. Each of the plurality of cache-lines and each of the plurality of sub-cache lines is associated with meta-data indicating one or more of a dirty state and an invalid state. The controller is connected to the memory and configured to (i) recognize sub-cache line boundaries and (ii) process the I/O requests in multiples of a size of said sub-cache lines to minimize cache-fills.

19 Claims, 5 Drawing Sheets

(51) Int. Cl.
*G06F 12/0891* (2016.01)
*G06F 12/0866* (2016.01)

(56) References Cited

U.S. PATENT DOCUMENTS

| | | | |
|---|---|---|---|
| 8,347,029 B2 | 1/2013 | Trika ............................. | 711/112 |
| 2007/0143548 A1* | 6/2007 | Nakanishi ........... | G06F 12/0804 711/144 |
| 2010/0088472 A1* | 4/2010 | Ukai ................... | G06F 12/0815 711/130 |
| 2012/0173510 A1 | 7/2012 | Risvik .......................... | 707/711 |

* cited by examiner

SYSTEM AND METHODS FOR CACHING A SMALL SIZE I/O TO IMPROVE CACHING DEVICE ENDURANCE

This application relates to U.S. Provisional Application No. 61/915,718, filed Dec. 13, 2013, which relates to U.S. application Ser. No. 14/066,938, filed Oct. 30, 2013, each of which are hereby incorporated by reference in their entirety.

FIELD OF THE INVENTION

The invention relates to data storage generally and, more particularly, to a method and/or apparatus for caching of a small size I/O to improve caching device endurance.

BACKGROUND

A conventional flash technology based cache device (e.g. SSD) is commonly used to cache frequently accessed "hot" data so that a host (application) access time for the "hot" data is improved. However, flash technology based devices can sustain only a limited number of writes before the flash storage area becomes unreliable or bad. The time when the cache device can sustain the writes reliably is also called a lifetime. After the cache device exhausts the lifetime, the cache device is either bypassed, thereby impacting performance, or the cache device needs to be physically replaced and rebuilt. To extend the lifetime of the cache device, the number of writes to the cache device is minimized. Conventional approaches for handling a cache miss for a host I/O, which is less than a cache-line size, tend to decrease the lifetime by increasing the total number of writes.

SUMMARY

The invention concerns an apparatus comprising a memory and a controller. The memory may be configured to (i) implement a cache and (ii) store meta-data. The cache comprises one or more cache windows. Each of the one or more cache windows comprises a plurality of cache-lines configured to store information. Each of the cache-lines comprises a plurality of sub-cache lines. Each of the plurality of cache-lines and each of the plurality of sub-cache lines is associated with meta-data indicating one or more of a dirty state and an invalid state. The controller is connected to the memory and configured to (i) recognize sub-cache line boundaries and (ii) process the I/O requests in multiples of a size of the sub-cache lines to minimize cache-fills.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a system and method that may (i) cache a small size I/O, (ii) improve caching device endurance, (iii) split a cache-line into separately accessible portions, and/or (iv) be implemented as one or more integrated circuits.

Figure 1:
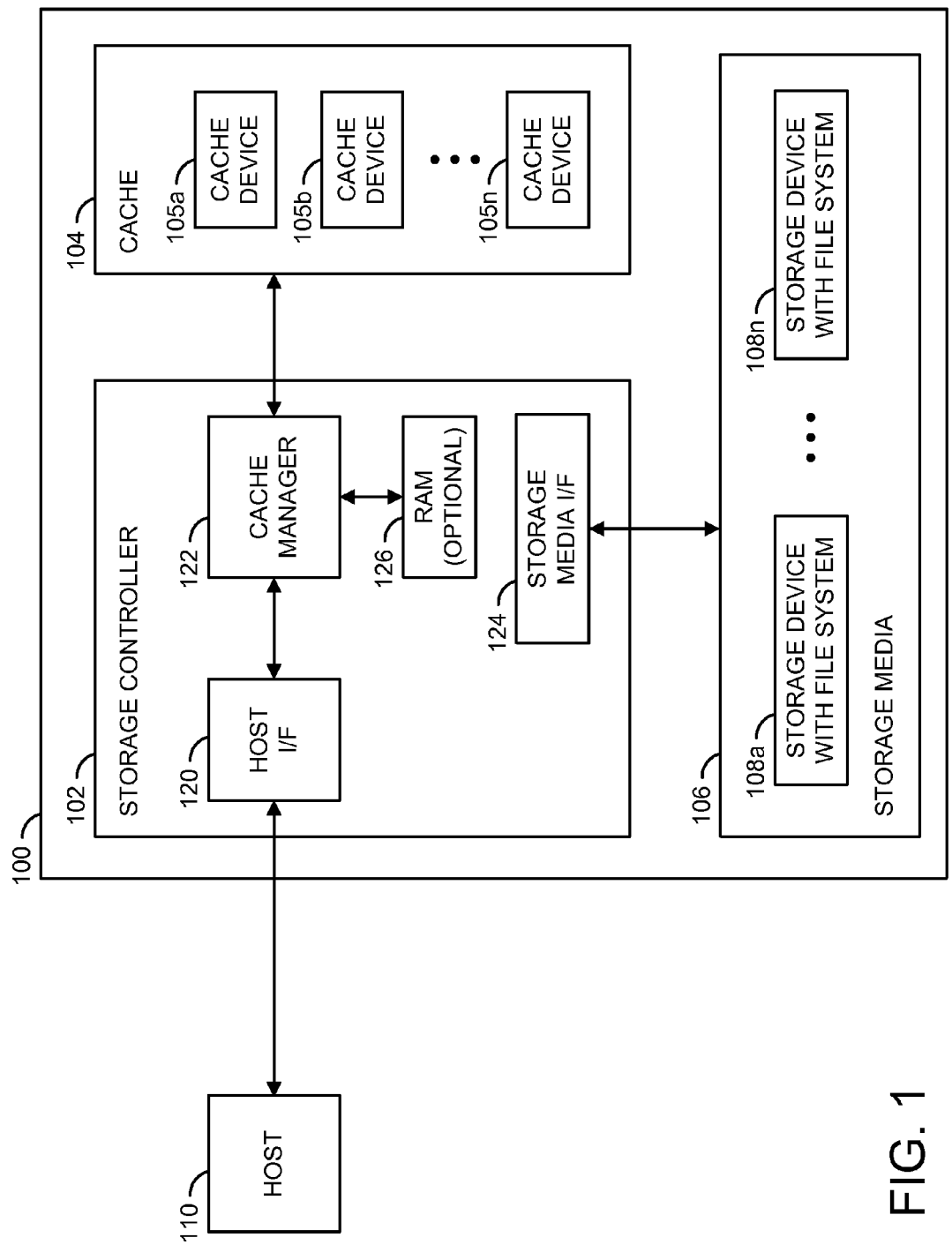
FIG. 1 is a diagram illustrating a storage system in accordance with an example embodiment of the invention.

Referring to FIG. 1, a diagram of a system 100 is shown illustrating an example storage system in accordance with an embodiment of the invention. In various embodiments, the system 100 comprises a block (or circuit) 102, a block (or circuit) 104, and a block (or circuit) 106. The block 102 implements a storage controller. The block 104 implements a cache. In various embodiments, the block 104 may be implemented as one or more cache devices 105a-105n. The one or more cache devices 105a-105n are generally administered as a single cache (e.g., by a cache manager of the storage controller 102). The block 106 implements a storage media (e.g., backend drive, virtual drive, etc.). The block 106 may be implemented using various technologies including, but not limited to magnetic (e.g., HDD) and Flash (e.g., NAND) memory. The block 106 may comprise one or more storage devices 108a-108n. Each of the one or more storage devices 108a-108n may include all or a portion of a file system. In various embodiments, the system 100 may be implemented using a non-volatile storage component, such as a universal serial bus (USB) storage component, a CF (compact flash) storage component, an MMC (MultiMediaCard) storage component, an SD (secure digital) storage component, a Memory Stick storage component, and/or an xD-picture card storage component.

In various embodiments, the system 100 is configured to communicate with a host 110 using one or more communications interfaces and/or protocols. According to various embodiments, one or more communications interfaces and/or protocols may comprise one or more of a serial advanced technology attachment (SATA) interface; a serial attached small computer system interface (serial SCSI or SAS interface), a (peripheral component interconnect express (PCIe) interface; a Fibre Channel interface, an Ethernet Interface (such as 10 Gigabit Ethernet), a non-standard version of any of the preceding interfaces, a custom interface, and/or any other type of interface used to interconnect storage and/or communications and/or computing devices. For example, in some embodiments, the storage controller 102 includes a SATA interface and a PCIe interface. The host 110 generally sends data read/write commands (requests) to the system 100 and receives responses from the system 100 via the one or more communications interfaces and/or protocols. The read/write commands generally include logical block addresses (LBAs) associated with the particular data input/output (I/O). The system 100 generally stores information associated with write commands based upon the included LBAs. The system 100 generally retrieves information associated with the LBAs contained in the read commands and transfers the retrieved information to the host 110.

In various embodiments, the controller circuit 102 comprises a block (or circuit) 120, a block (or circuit) 122, a block (or circuit) 124, and a block (or circuit) 126. The circuit 120 implements a host interface (I/F). The circuit 122 implements a cache manager. The circuit 124 implements a storage medium interface (I/F). The circuit 126 implements an optional random access memory (RAM) that may be configured to store images of cache management information (e.g., meta-data) in order to provide faster access. In some embodiments, the circuit 126 may be omitted. The circuits 104, 122 and 126 (when present) generally implement caching data structures and schemes in accordance with embodiments of the invention.

Figure 2:
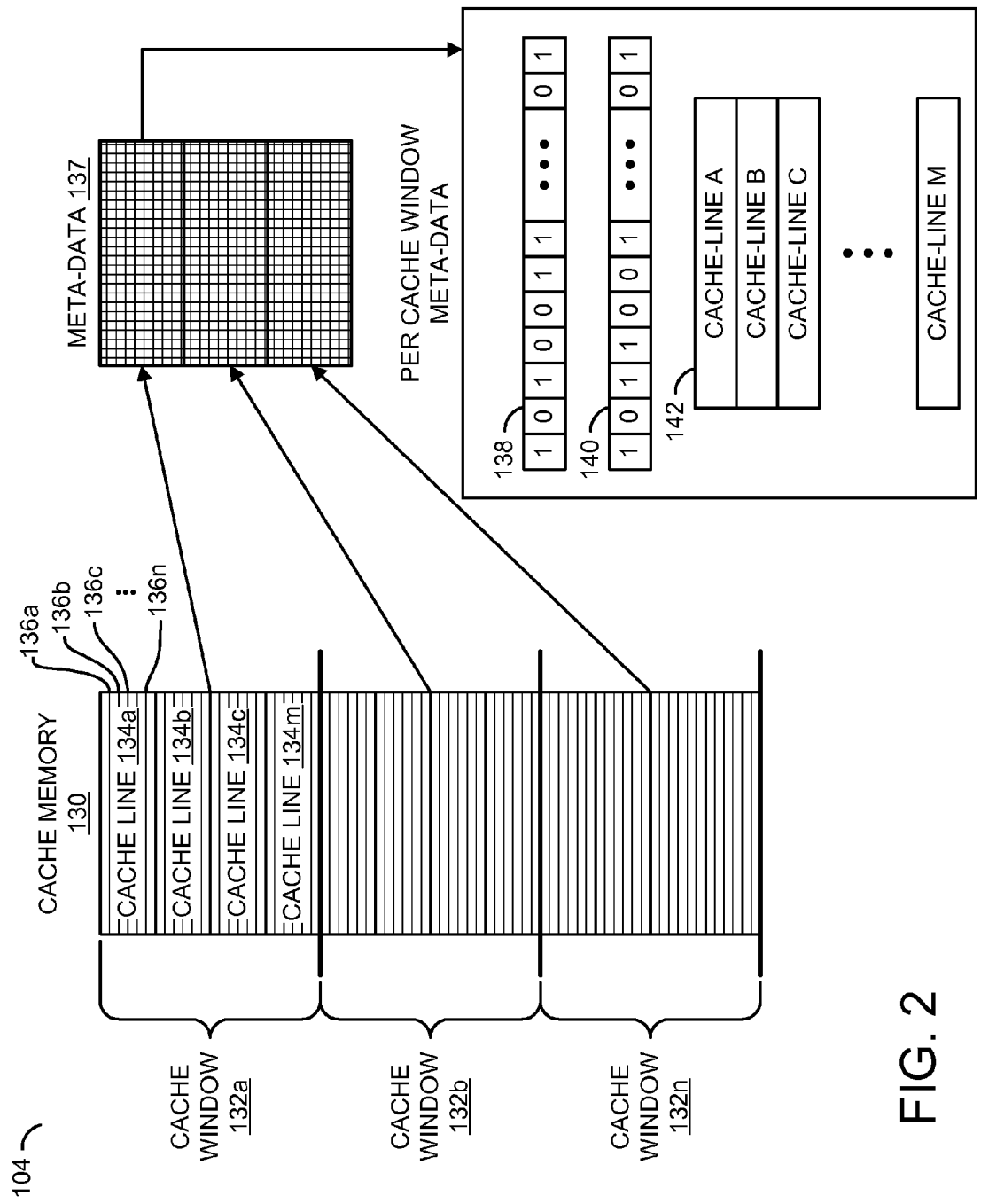
FIG. 2 is a diagram illustrating an example cache memory structure.

Referring to FIG. 2, a diagram is shown illustrating an example cache memory structure implemented in the block 104 of FIG. 1. Caching implementations have a uniform way of handling all cached information. In a write back cache mode, the cache memory 130 of the circuit 104 is split into several cache windows 132a-132n. Each of the cache windows 132a-132n are in turn split into several cache-lines 134a-134m. Each of the cache-lines 134a-134n are in turn split into several cache sub-lines. The cache-line 134a is shown implemented as a number of cache sub-lines 136a-136n. The number of cache windows 132a-132n, the number of cache-lines 134a-134n, and the number of cache sub-lines 136a-136n may each be a variable number that may be the same number or a different number. For example, there may be more (or less) cache sub-lines 136a-136n than the number of cache-lines 134a-134n. The data that is cached is read or written from the storage media 106 in units of cache-line size. Cache data structures (meta-data) 137 are also defined per cache-line. The meta-data 137 keeps track of whether a particular cache-line is resident in the cache memory 130 and whether the particular cache-line 134a-134m is dirty.

In various embodiments, the meta-data 137 comprises a first valid bitmap 138, a second dirty bitmap 140, and cache-line information 142. The first valid bitmap 138 includes a first valid flag or bit associated with each cache-line 134a-134m. The second dirty bitmap 140 includes a second dirty flag or bit associated with each cache-line 134a-134m. A state of the first flag indicates whether the corresponding cache-line is valid or invalid. A state of the second flag indicates whether the corresponding cache-line is dirty or clean. In some implementations, the cache-lines within a cache window are not physically contiguous. In that case, the per cache window meta-data 137 stores the information about the cache-lines (e.g. cache-line number) which are part of the cache window in the cache-line information 142. In one example, a size of the cache-line information 142 is four bytes per cache-line. The meta-data 137 is stored persistently on the cache device 104 and, when available, also in the block 106 for faster access. For a very large cache memory, typically the cache-line size is large (>=64 KB) in order to reduce the size of the meta-data 137 on the cache device 104 and in the block 116.

Updates of the meta-data 137 are persisted on the cache device 104. Updating of the meta-data 137 is done at the end of each host I/O that modifies the meta-data 137. Updating of the meta-data 137 is also done during a shutdown process. Whenever a cache window 132a-132n is to be flushed (e.g., either during system recovery following a system reboot, or to free up active cache windows as part of a least recently used replacement or maintaining a minimum number of free cache windows in write back mode), the determination of which cache-lines to flush is based on picking all the valid cache-lines that are marked dirty. Usually, the flush is done by a background task. Once the flush is done successfully, the cache-lines are again indicated as being clean (e.g., the dirty bit for the corresponding cache-lines is cleared).

The circuit 104 is generally compatible with existing caching approaches. For example, the circuit 104 may be used to implement a set of priority queues (in an example implementation, from 1 to 16, where 1 is the lowest priority and 16 is the highest priority), with more frequently accessed data in higher priority queues, and less frequently accessed data in lower priority queues. A cache window promotion, demotion and replacement scheme may be implemented that is based primarily on LRU (Least Recently Used) tracking. The data corresponding to the cache windows 132a-132n is normally read and write intensive. A certain amount of data that is read/written to a cache window within a specified amount of time (or I/Os) makes the cache window "hot". Until such time, a "heat index" needs to be tracked (e.g., via virtual cache windows). Once the heat index for a virtual cache window crosses a configured threshold, the virtual cache window is deemed hot, and a real cache window is allocated, indicating that the data is henceforth cached. While the heat index is being tracked, if sequential I/O occurs, the heat index is not incremented for regular data access. This is because caching sequential I/O access of data is counter-productive. Purely sequential I/O access of data is handled as pass-through I/O issued directly to the storage media 106 since these workloads are issued very rarely. These are usually deemed as one time occurrences. The above are processing steps done for non-journal I/O (read or write).

Once a real cache window is allocated, any I/O (read or write) on a cache-line that is invalid is preceded by a cache read-fill operation. The cache-line is made valid by first reading the data from the corresponding LBAS on the storage medium 106 and writing the same data to the corresponding cache device. Once a cache-line is valid, all writes to the corresponding LBAs are directly written only to the cache device 104 (since the cache is in write back mode), and not written to the storage media 106. Reads on a valid cache-line are fetched from the cache device 104.

When a user I/O request spans across two cache windows, the caching layer breaks the user I/O request into two I/O sub-requests corresponding to the I/O range covered by the respective windows. The caching layer internally tracks the two I/O sub-requests, and on completion of both I/O sub-requests, the original user I/O request is deemed completed. At that time, an I/O completion is signaled for the original user I/O request.

In the context of caching technology, for each host write that goes to cache device, the caching process performs some additional amount of writing in order to manage the cached data efficiently. The ratio of the size of data written to the cache device to the size of data written by the host 110 may be referred to as cache write amplification (CWA). The following equation EQ1 defines a CWA:

$$CacheWriteAmplification = \frac{Size of data written to cache device}{Size of data written by the host} \quad \text{EQ 1}$$

In order to increase the lifetime of a cache, the cache write amplification should be kept as small as possible.

When a cache-line corresponding to the requested blocks in the host I/O is found invalid in the cache window, the cache-line is read filled. This is also called cache miss management for the "hot" I/O. Conventional approaches have a high cache write amplification when handling a cache miss, as explained below.

Consider a cache-line size of 64 KB when a host write I/O size is 4 KB. The cache-line corresponding to the requested write from the host 110 is invalid in the cache window. A host write I/O (4 KB) is first transferred to the cache device. The remaining part of the cache-line (e.g., 60 KB) is then read from the backend disk/VD and transferred to the cache device to mark the complete cache-line valid (and dirty). The cache-line metadata (which indicates the new dirty cache-line) is then transferred to the cache device (typically 4 KB). The cache write amplification is (4 KB+60 KB+4 KB)/(4 KB)=17, (e.g., the cache process write size is 17 times that of the host write I/O size). In case of a high number of cache misses, such high cache write amplification would be difficult for a flash technology based cache device, reducing the lifetime significantly.

Making cache-line size smaller does not help since smaller cache-lines increases the overall number of cache-lines in the cache device 100. An implementation which keeps cache-lines non-contiguous within the cache window will need larger meta-data 137 to store the cache-line information list (refer to FIG. 1). For example, with a 1 TB cache device with a 4 KB cache-line size, the amount of memory needed to store cache-line information (e.g., 4 Byte per cache-line) will be 1 GB. Such memory storage is more than is typically desired for most systems to only store meta-data.

The circuit 100 splits the cache-lines 134a-134n into small size sub-cache lines 136a-136n, as shown in FIG. 2. Each bit of valid bitmap (138) and dirty bitmap (140) represents status of one of the sub-cache lines. When a host write I/O size is a multiple of the size of sub-cache lines 136a-136n, no cache read fill is done and the sub-cache lines 136a-136n are directly updated with data from the host 110. Similarly, when a host read I/O size is a multiple of the size of the sub-cache lines 136a-136n, then only the sub-cache lines 136a-136n needed are fetched from the HDD (or backend VD) during a cache miss. As a result, the cache write amplification CWA is significantly reduced as discussed below.

Consider sub-cache line size of 4 KB and a host write I/O size of 4 KB. A host write I/O (4 KB) is first transferred to the sub-cache line of cache device (irrespective of the previous valid/invalid state of sub-cache line). The cache-line metadata (which indicates the new dirty sub-cache line) is then transferred to the cache device (typically 4 KB). The cache write amplification is generally calculated as (4 KB+4 KB)/(4 KB)=2, (e.g., the cache process write size is 2 times that of host write I/O size). This is a significant improvement compared to cache write amplification of 17 discussed using conventional approaches.

The circuit 100 is most efficient when storage subsystem block size in the host 110 is a multiple of the size of the sub-cache-lines 136a-136n. The procedure to set the storage subsystem block size (e.g., where both the sub-cache line size and the storage block size is 4 Kbyte) is well known. Once a storage subsystem block size is defined, all host I/O size is multiple of the storage subsystem block size.

The cache-lines 134a-134n may be split into the smaller sub-cache lines 136a-136n with each bit of valid bitmap and/or a dirty bitmap representing the state of a sub-cache line. The particular size of the sub-cache lines may be varied to meet the design criteria of a particular implementation. On a 1 TB cache device, with a 4 Kbyte sub-cache line, the total size of both valid and dirty bitmap is around 64 Mbyte.

In one example, the sub-cache lines 136a-136n within a cache-line 134a-134n are physically contiguous. As a result, such an implementation allows the cache-lines 134a-134n within one of the cache windows 132a-132n to be noncontiguous and does not allocate additional memory when the cache-lines get split into the sub-cache lines 136a-136n.

Figure 3:
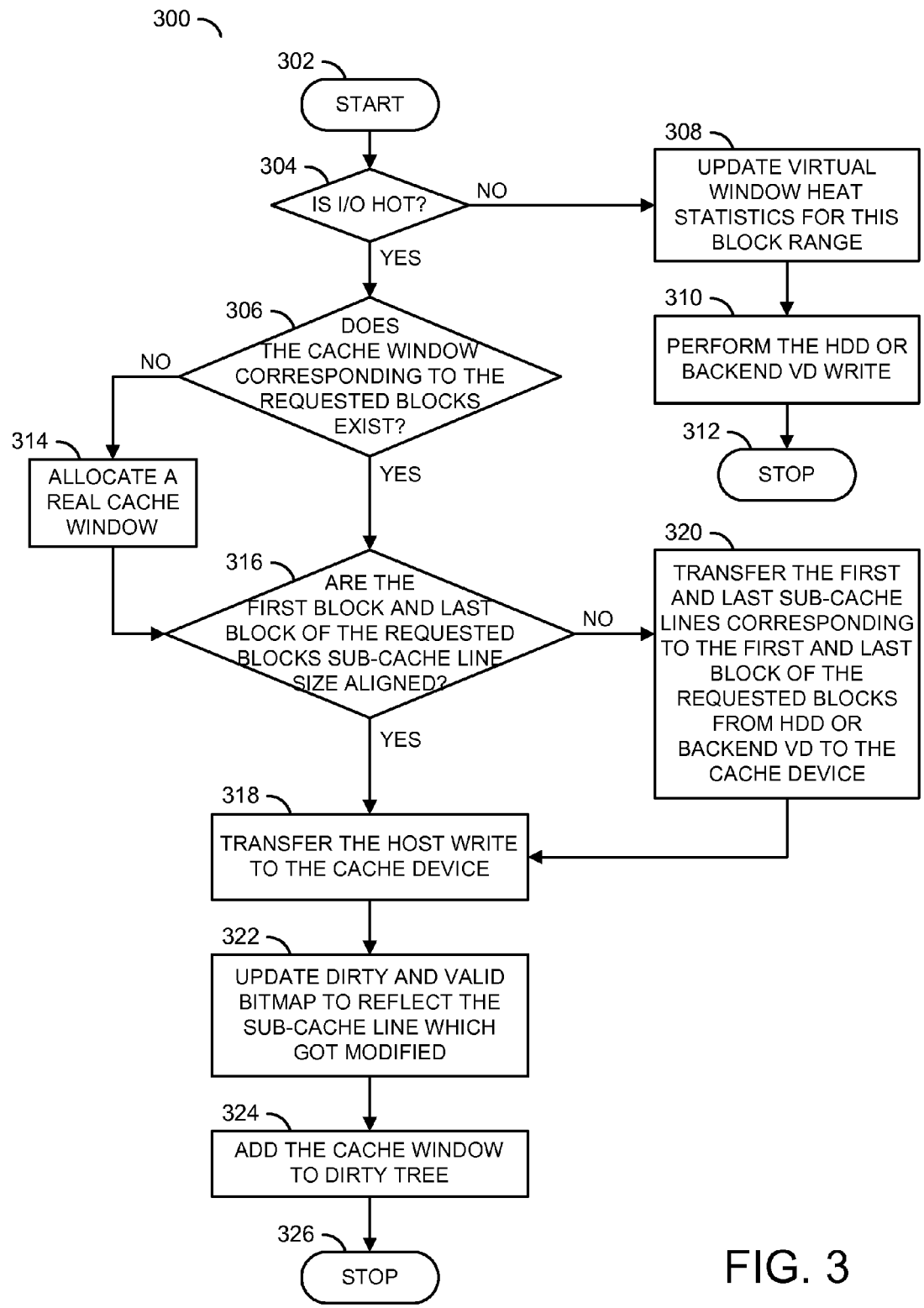
FIG. 3 is a flow diagram of a process to handle write I/O requests.

Referring to FIG. 3, a diagram of a method (or process) 300 is shown. The method 300 may handle write I/O operations. The method 300 generally comprises a step (or state) 302, a decision step (or state) 304, a decision step (or state) 306, a step (or state) 308, a step (or state) 310, a step (or state) 312, a step (or state) 314, a decision step (or state) 316, a step (or state) 318, a step (or state) 320, a step (or state) 322, a step (or state) 324, a step or (state) 326. The step 302 may start the process 300. The step 304 may determine whether the I/O is a hot I/O. If so, the method 300 moves to the state 306. If not, the method 300 moves to the state 308. The state 308 may update the virtual window heat statistics for the particular block range. Next, the state 310 may perform a HDD or backend VD write. Next, the state 312 stops the process 300. If the state 304 determines that an I/O is a hot I/O, then the method 300 moves to the state 306. The state 306 determines if the cache window corresponding to the requested blocks exists. If not, the method 300 moves to the state 314. The state 314 may allocate a real cache window, then move to the decision state 316. If the decision state 306 determines that the cache window corresponding to the requested block does exist, the method moves to the state 316. The decision state 316 determines if the first block and last block of the requested blocks sub-cache line sizes are aligned. If not, the method 300 moves to the state 320. If so, the method 300 moves to the state 318. In the state 320, the method 300 transfers the first and last sub-cache lines corresponding to the first and last block of the requested blocks (the HDD or backend VD) to the cache device. Next, the state 318 transfers the host write to the cache device 104. Next, the state 322 updates the dirty and valid bitmap to reflect the sub-cache line which was modified. Next, the state 324 adds the cache window to the dirty tree. Next, the state 326 stops the process.

When a write from the host 110 occurs in a hot cache window 132a-132n, and the write I/O is aligned to the sub-cache-lines 136a-136n, the caching process then transfers the write from the host 110 to the sub-cache lines 136a-136n without any read fill operation. However, in case of a host I/O that is not aligned to the sub-cache lines (e.g., a situation that can happen only if the storage subsystem of the host 110 has a block size that is less than the size of the sub-cache line) then the first and last of the sub-cache lines 136a-136n corresponding to the host I/O range is first read filled from the HDD (or backend VD). Next, the sub-cache lines are updated with data from the host 110.

Figure 4:
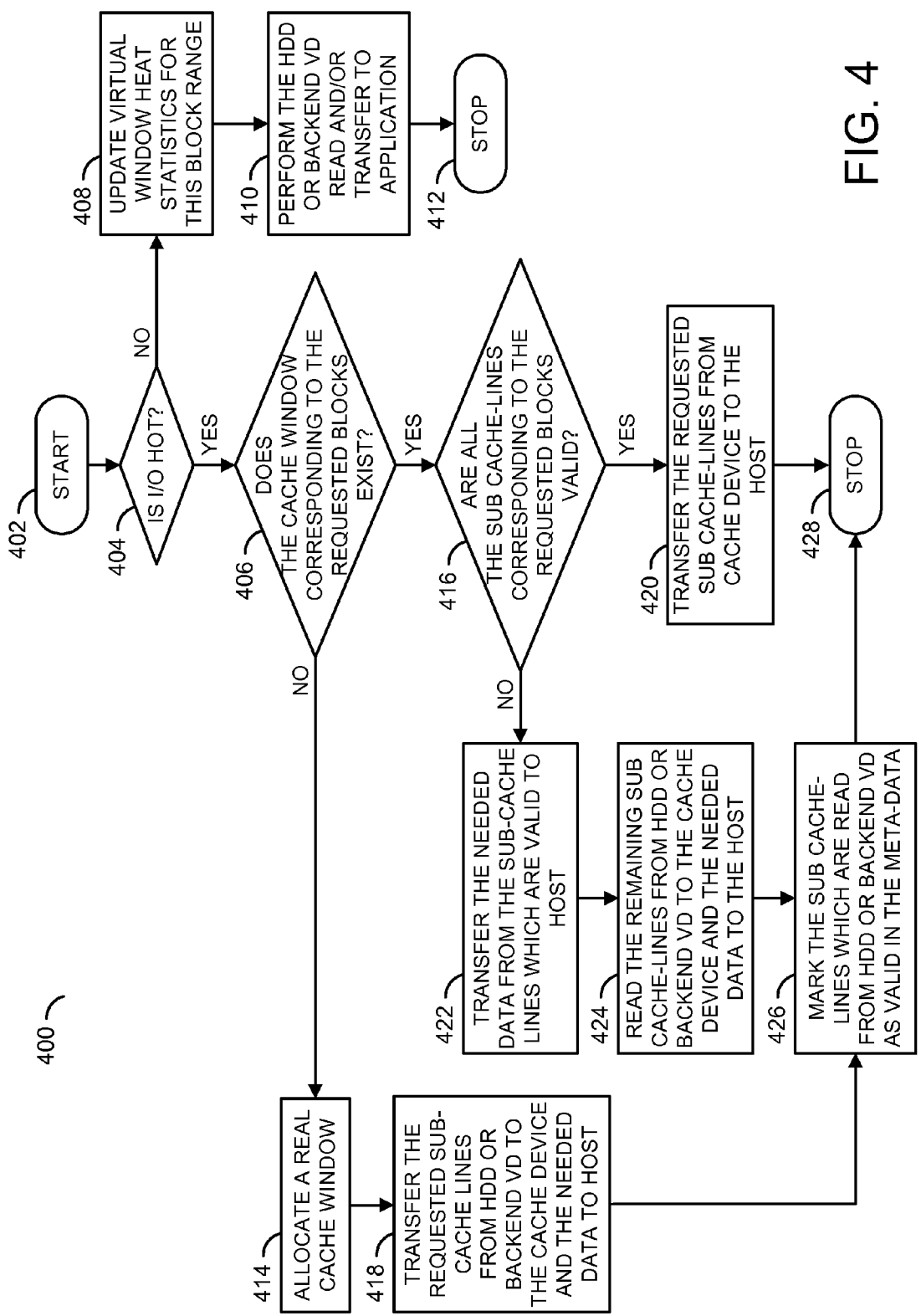
FIG. 4 is a flow diagram of a process to handle read I/O requests.

Referring to FIG. 4, a method (or process) 400 is shown. The method 400 may be used to process read I/O operations. The method 400 generally comprises a step (or state) 402, a decision step (or state) 404, a decision step (or state) 406, a step (or state) 408, a step (or state) 410, a step (or state) 412, a step (or state) 414, a decision step (or state) 416, a step (or state) 418, a step (or state) 420, a step (or state) 422, a step (or state) 424, a step (or state) 426, a step (or state) 428. The state 402 starts the process 400. Next, the decision state 404 determines if an I/O is a hot I/O. If so, the method 400 moves to the decision state 406. If not, the method 400 moves to the state 408. The state 408 updates the virtual window heat statistics for the particular block range. Next, the state 410 performs the HDD or backend VD read and/or transfer application. Next, the state 412 stops the method 400. In the decision state 406, the method 400 determines if the cache window corresponding to the requested block exists. If so, the method 400 moves to the state 416. If not, the method moves to the state 414. The state 414 allocates a real cache window. The state 418 transfers the requested sub-cache lines from the HDD or backend VD to the cache device and the needed data to the host 110 and the method 400 moves to the state 426. In the decision state 416, the method 400 determines if all of the sub-cache lines corresponding to the requested blocks are valid. If so, the method 400 moves to the state 420. The state 420 transfers the requested sub-cache lines from the cache device 104 to the host 110. In the decision state 416 if the method 400 determines all of the sub-cache lines corresponding to the requested blocks are not valid, the method 400 moves to the state 422. The state 422 transfers the needed data from the sub-cache lines which are valid to the host 110. Next, the state 424 reads the remaining sub-cache lines from the HDD or backend VD to the cache device 104 and the needed data to the host 110. Next, the state 426 marks the sub-cache lines which are read from the HDD or backend VD as valid in the metadata. Next, the state 428 stops the method 400.

When a read from the host 110 occurs to a hot cache window 132a-132n and the particular sub-cache lines 136a-136n holding the needed data blocks are valid, then the data blocks are transferred from the cache device 104 as shown in FIG. 4. If however, one or more of the sub-cache lines 136a-136n are not valid, then these are made valid by transferring the data blocks corresponding to the invalid sub-cache lines 136a-136n to the cache device 104. Then the needed data blocks are transferred to the host 110.

Figure 5:
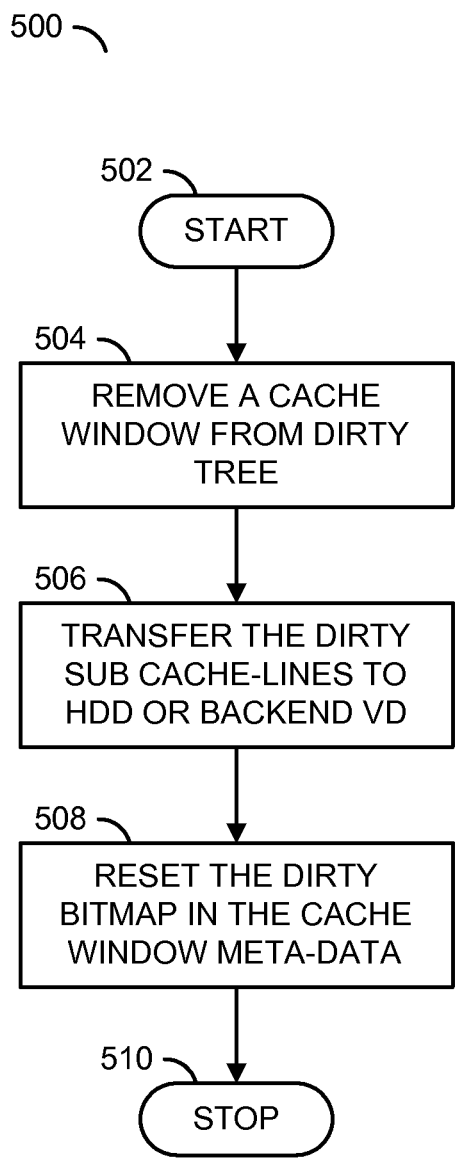
FIG. 5 is a diagram of a background flush operation.

Referring to FIG. 5, a method (or process 500 is shown. The method 500 may perform a background flush operation. The method 500 generally comprises a step (or state) 502, a step (or state) 504, a step (or state) 506, a step (or state) 508, a step (or state) 510. The method 500 starts the process in the state 502. Next, the state 504 removes a cache window from the dirty tree. Next, the state 506 transfers the dirty sub-cache lines to the HDD or backend VD. Next, the state 508 resets the dirty bitmap in the cache window meta-data. Next, the state 510 stops the process 500. Once the number of cache windows with dirty sub-cache lines crosses a threshold, the sub-cache lines are flushed to the HDD or backend VD, as shown in FIG. 5.

With this approach of sub-cache line, the circuit 100 may ensure that the number of write operations performed on the cache device 104 is limited. In one example, the number of write operations may be as small as possible with very low cache write amplification. The operations of the circuit 100 may result in a longer endurance of the cache device 104.

The functions performed by the diagrams of FIGS. 3-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to (i) implement a cache and (ii) store meta-data, said cache comprising one or more cache windows, each of said one or more cache windows comprising (i) a plurality of cache-lines configured to store information and (ii) each of said cache-lines comprises a plurality of sub-cache lines, wherein each of said plurality of cache-lines has first meta-data and each of said plurality of sub-cache lines has second meta-data distinct from the first meta-data, at least the second meta-data indicating one or more of a dirty state and an invalid state for each of said plurality of sub-cache lines; and
a controller connected to said memory and configured to (i) recognize sub-cache line boundaries and (ii) perform processing of I/O requests in multiples of a size of said sub-cache lines to minimize cache-fills,
wherein the controller is configured to perform the processing for a write I/O request by:
determining whether the write I/O request is a hot write I/O request based on requested blocks of the write I/O request; and
determining whether sub-cache line sizes of a first block and a last block of the requested blocks of the write I/O request are aligned, and
wherein, if i) the write I/O request is the hot write I/O request, and ii) the first block and the last block sub-cache line sizes are aligned, the controller is configured to perform the processing for the write I/O request by:
transferring the write I/O request to the cache; and
updating the invalidity state and the dirty state to reflect which of the plurality of sub-cache lines is modified by the write I/O request.

2. The apparatus according to claim 1, wherein said apparatus maximizes an endurance of said cache when passing the I/O requests to a caching layer.

3. The apparatus according to claim 1, wherein said memory comprises of one or more cache devices.

4. The apparatus according to claim 1, wherein if the write I/O request has an I/O size that is a multiple of said size of said sub-cache line, the write I/O request is processed by directly updating one or more corresponding locations in the cache with data from a host without any prior cache read fill of the cache for one or more corresponding sub-cache lines and the cache-lines.

5. The apparatus according to claim 1, wherein a read I/O request with an I/O size that is a multiple of the size of the sub-cache line is processed by performing a cache read fill of the cache by issuing a corresponding read from a hard disk drive (HDD of a host for only the sub-cache lines involved in the read I/O request, and does not perform any cache fill of other sub-cache lines and/or cache-lines that are outside a predetermined I/O range.

6. The apparatus according to claim 1, wherein one or more validity bits of the second meta-data corresponding to the sub-cache lines involved in the I/O requests are set in a validity bitmap for both read I/O requests and write I/O requests.

7. The apparatus according to claim 1, wherein one or more dirty bits of the second meta-data corresponding to the sub-cache lines involved in the I/O requests are set in a dirty bitmap for write I/O requests.

8. The apparatus according to claim 7, wherein the dirty bits corresponding to the sub-cache lines are cleared in the dirty bitmap every time the data in a corresponding location of the cache is flushed to a hard disk drive (HDD of a host.

9. The apparatus according to claim 1, wherein the controller is configured to perform the processing for a read I/O request by:
determining whether the read I/O request is a hot read I/O request based on requested blocks of the read I/O request; and
determining whether all sub-cache lines corresponding to the requested blocks of the read I/O request are valid.

10. The apparatus according to claim 9, wherein, if i) the read I/O request is the hot read I/O request, and ii) all sub-cache lines corresponding to the requested blocks of the read I/O request are valid, the controller is configured to perform the processing for the read I/O request by:
transferring the sub-cache lines corresponding to the requested blocks of the read I/O request from the cache to a host.

11. The apparatus according to claim 9, wherein if i) the read I/O request is the hot read I/O request, and ii) at least one of the sub-cache lines corresponding to the requested blocks of the read I/O request is not valid, the controller is configured to perform the processing for the read I/O request by:
transferring valid ones of the sub-cache lines corresponding to the requested blocks of the read I/O request to a host;
reading invalid ones of the sub-cache lines corresponding to the requested blocks of the read I/O request from a non-cache memory to the host; and
marking the read sub-cache lines as valid in the second meta-data.

12. The apparatus according to claim 1, wherein the first meta-data includes a cache-line number of the cache-lines.

13. The apparatus according to claim 12, wherein the second meta-data includes one or more validity bits organized into a validity bitmap and one or more dirty bits organized into a dirty bitmap to indicate the invalid state and the dirty state, respectively.

14. An apparatus comprising:
a memory configured to (i) implement a cache and (ii) store meta-data, said cache comprising one or more cache windows, each of said one or more cache windows comprising (i) a plurality of cache-lines configured to store information and (ii) each of said cache-lines comprises a plurality of sub-cache lines, wherein each of said plurality of cache-lines and each of said plurality of sub-cache lines is associated with meta-data indicating one or more of a dirty state and an invalid state; and
a controller connected to said memory and configured to (i) recognize sub-cache line boundaries and (ii) perform processing of I/O requests in multiples of a size of said sub-cache lines to minimize cache-fills,
wherein a write I/O request having an I/O size that is a multiple of said size of said sub-cache line is processed by directly updating one or more corresponding locations in the cache with data from a host without any prior cache read fill of the cache for one or more corresponding sub-cache lines and the cache-lines,
wherein the I/O write request having a first block size and a last block size different than the size of the corresponding sub-cache lines is processed by first performing a prior cache read fill of the cache by issuing a corresponding read from a HDD of the host for only the first and last corresponding sub-cache lines, and processing all other sub-cache lines involved in the write I/O request without any cache read fill operations.

15. A method for caching a small size I/O to improve caching device endurance, comprising the steps of:
configuring a memory to (i) implement a cache and (ii) store meta-data, said cache comprising one or more cache windows, each of said one or more cache windows comprising (i) a plurality of cache-lines configured to store information and (ii) each of said cache-lines comprises a plurality of sub-cache lines, wherein each of said plurality of cache-lines has first meta-data and each of said plurality of sub-cache lines has second meta-data distinct from the first meta-data, at least the second meta-data indicating one or more of a dirty state and an invalid state for each of said plurality of sub-cache lines; and recognizing sub-cache line boundaries and performing I/O processing in multiples of a size of said sub-cache lines to minimize cache-fills, wherein the performing I/O processing for a read I/O request includes:

determining whether the read I/O request is a hot read I/O request based on requested blocks of the read I/O request; and determining whether all sub-cache lines corresponding to the requested blocks of the read I/O request are valid, and wherein if i) the read I/O request is the hot read I/O request, and ii) all sub-cache lines corresponding to the requested blocks of the read I/O request are valid, the performing the I/O processing further includes:

transferring the sub-cache lines corresponding to the requested blocks of the read I/O request from the cache to a host.

16. The method according to claim 15, wherein said method maximizes an endurance of said cache when passing the I/O requests to a caching layer.

17. The method according to claim 15, wherein the performing the processing for a write I/O request includes:

determining whether the write I/O request is a hot write I/O request based on requested blocks of the write I/O request; and determining whether sub-cache line sizes of a first block and a last block of the requested blocks of the write I/O request are aligned.

18. The method according to claim 17, wherein, if i) the write I/O request is the hot write I/O request, and ii) the first block and the last block sub-cache line sizes of the write I/O request are aligned, the controller is configured to perform the processing for the write I/O request by:

transferring the write I/O request to the cache; and updating the invalidity state and the dirty state to reflect which of the plurality of sub-cache lines is modified by the write I/O request.

19. The method according to claim 17, wherein if i) the write I/O request is the hot I/O request, and ii) the first block and the last block sub-cache line sizes of the write I/O request are not aligned, the controller is configured to perform the processing for the write I/O request by:

transferring first and last sub-cache lines corresponding to the first block and the last block, respectively, to the cache device;

transferring the write I/O request to the cache; and updating the invalidity state and the dirty state to reflect which of the plurality of sub-cache lines is modified by the write I/O request.

* * * * *